April 11, 1961  W. L. HOUSTON, JR  2,979,316
LIQUID AND GAS CONTACTING APPARATUS
Filed Oct. 10, 1957  2 Sheets-Sheet 1

INVENTOR.
W. L. HOUSTON, JR.
BY *Hudson and Young*

ATTORNEYS.

April 11, 1961 W. L. HOUSTON, JR 2,979,316
LIQUID AND GAS CONTACTING APPARATUS
Filed Oct. 10, 1957 2 Sheets-Sheet 2

INVENTOR.
W. L. HOUSTON, JR.
BY Hudson and Young

ATTORNEYS.

United States Patent Office 2,979,316
Patented Apr. 11, 1961

2,979,316
LIQUID AND GAS CONTACTING APPARATUS

William L. Houston, Jr., Old Ocean, Tex., assignor to Phillips Petroleum Company, a corporation of Delaware Filed Oct. 10, 1957, Ser. No. 689,311
3 Claims. (Cl. 261—114)

This invention relates to a liquid and gas contacting apparatus. In one of its aspects the invention relates to a vapor-liquid contacting tray adaptable for use in a fractionating column, the tray surface having at least one opening having a loosely placed cover thereon which normally would coact to close the opening completely when no vapor is passing through the plate opening, the cover being so shaped that when no vapor is flowing through said opening the cover cannot completely close said opening and cannot remain in a position parallel to said tray surface. In another of its aspects, the invention relates to a vapor-liquid contacting tray or deck or plate as described wherein the portion of the cover contacting the plate has a single protrusion, crimp or dimple in or on its surface which prevents said cover from sealingly engaging the opening in the deck and from remaining in a position parallel to the deck surface when no vapor is flowing through the opening. In another of its aspects, the protrusion is provided on the tray surface ordinarily engaged by the cover when no vapor is flowing through the opening. In a still further aspect of the invention, two or more such crimps or protrusions or dimples are provided upon said cover or plate or one of the protrusions can be provided upon the plate and one upon the cover, for reasons which will become fully apparent upon a consideration of this disclosure, the drawings, and the appended claims.

It is known in the art of liquid and gas contacting or vapor fractionation wherein a gas or vapor and a liquid are contacted together at the surface of a tray having openings therein through which the vapor flows upwardly through the liquid upon the tray to provide covers for said openings which open to a more or less extent to allow more or less vapors to flow through said opening depending upon the total flow of vapors rising through the plate. It is also known to provide such covers with, say, ribs on their under sides to prevent such covers from completely sealingly engaging the opening in the plate when no vapor is flowing upwardly through the opening. Thus, in one such apparatus which has been described the opening cover or check valve is so shaped as to at all times maintain a substantially annular clearance between each valve and the edge of its respective opening or aperture so that the result is, that even in their lower most positions the valves will permit upward passage of gas through the plate openings or apertures, the feature of the check valve being that it is possible with said valves to maintain a closely uniform clearance between each valve and the edge of its respective plate aperture thereby establishing a condition of uniform gas flow through the apertures and uniform distribution of gas throughout the area of the plate. It is also described that the valve prior to being modified had an inability to open simultaneously and to exactly the same extent which seemed to be due to the fact that it was impractical if not impossible to make the valves exactly the same size and weight and hence maintain exactly the same resistance to opening for each valve.

It has now been found that the covers or check valves upon a plate, tray or deck in a fractionating column stick together. This sticking together can be caused by a variety of factors. For example, in a new crude oil flashing tower in which there were installed six trays of the type wherein the valve completely seats when no vapor is flowing and wherein one tray was made of Monel metal and five trays were made of carbon steel it was found after the vessel had been hydrostatically tested with trays in place about three to four weeks prior to placing the tower in operation that the valves on the carbon steel trays were tightly stuck and rusted to the tray decks. It was necessary to loosen and free up the valves on the carbon steel trays before the tower could be placed into operation. It will be appreciated, also, that during periods of non-use even after such a tower as here discussed has been installed similar sticking can occur due to rusting, etc. Furthermore, since it is virtually impossible, as already noted in the prior art, to provide substantially 100 percent even flow of vapors through apertures during use, probably due at least in part not only to the inability to manufacture openings and valves of the same sizes and valves of the same weight but also due to the tendency of vapors in a tower to flow somewhat differently in different portions thereof, it is possible even during operation of a tower due to such uneven vapor flow that some valves or covers will open to a lesser extent than others and ultimately become fixed in a slightly open position due to deposition of dirt or other foreign material on the tray or deck. Indeed, especially at the low throughputs, it is possible that some valves will not open at all and that the foreign matter floating or moving about upon the tray will settle at such closed valves sealing them to the plate.

I have found that by so constructing the tray or opening cover or both that at no time can the cover or valve completely sealingly engage the opening in the tray or deck and when no vapor is flowing through said opening the cover cannot remain in a substantially horizontal position that is, substantially parallel to said tray or deck, there results upon flow of vapors a vibration of the cover which tends to shake loose any accumulating dirt and tends to break the cover or valve from the tray or deck. Furthermore, in seating such a valve or opening cover, as now will be described, will fall more on one side than the other so that it can never become so stuck to the plate as to completely seal the opening.

It is object of this invention to provide a gas-liquid contacting apparatus. It is another object of this invention to provide a valve for a fractionating tray which cannot under any circumstance completely sealingly engage the tray and which will vibrate due to passage of vapor through openings in the plate past said valve. Furthermore, it is an object of this invention to provide a valve or opening cover for a fractionating plate or tray which cannot come to rest, when no vapor is flowing through the plate, in such a position that it is substantially parallel to the tray.

Other aspects, objects, and several advantages of the invention are apparent from a consideration of this disclosure, the drawing, and the appended claims.

According to this invention, a vapor-liquid contacting tray adaptable for use in a fractionating column comprising a tray surface, and at least one opening in said surface for permitting vapors to rise therethrough, a cover placed loosely upon said opening, the portion of said cover and the portion of said tray surface which normally would coact to close the opening completely when no vapor is passing through said opening being so shaped that when no vapor is flowing through said opening the cover cannot completely close said opening and cannot remain in a position parallel to said tray surface, is provided.

More specifically, according to the invention, the said cover or plate at the place where the cover and plate ordinarily would sealingly engage with each other when no vapor is rising through the opening in the plate is provided with a single protrusion, with two protrusions, or a plurality of such protrusions arranged so that the plate, in a position of rest of the valve, is contacted thereby at two, three or more points which are never exactly spaced so that the said cover cannot come to rest in a position parallel to the surface of the plate.

The eight figures of the drawing show, respectively, in the order of their numbers, a perspective view of a convex plate cover having two protrusions or beads placed substantially diametrically opposite to each other along the under side of the periphery of the cover, a cross-sectional view of a plate cover having sharp protruding portions substantially opposite each other along the under side of the periphery of the cover, a perspective view of a dished plate cover resting upon bead-like protrusions extending upwardly from the periphery of the tray opening substantially diametrically placed opposite each other across said opening, and an enlarged view of a portion of the tray opening in cross-section showing a protrusion thereon, an under side view of the opening cover of Figure 1, showing the protrusions in the periphery of the cover, a cross-sectional view of a cover showing a bead-like protrusion on the under side of its periphery, a J-shaped covering having a single protrusion, and a fractionating tower containing a tray according to the invention.

Referring now to Figures 1 and 5, it will be noted that the protrusion or bead on the under side of the periphery of the cover is made by crimping through the edge of the cover as indicated by the dotted lines. Thus, plate 1 does not contact the periphery of cover 2 except at the following places at the beads or crimps 3 and 4 and at one other point which must be at one side or another of a line drawn through the points at which crimps 3 and 4 are located. The third point of contact is not shown on the drawing since it would tend to obfuscate its understanding. However, such a point will usually fall at about 5 or 6 in Figure 5.

Referring now to Figure 2, it will be seen that the sharp protrusions 3 and 4 extend downwardly from the periphery of cover 2 into which they are placed by crimping, pressing or other means.

It will be obvious to one skilled in the art in possession of this disclosure that in lieu of crimping to arrive at protrusions 3 and 4, it is possible to add metal to the periphery of the valve cover by way of a bead of spot welding or by other means.

Referring now to Figure 3, a dished valve or opening cover 10 rests at two points upon beads 11 and 12 disposed substantially opposite from each other across the opening in plate 13. Beads 11 and 12 are either formed as an integral part of plate 13 or are spot welds thereon or can be crimped into the plate after it has been made.

Figure 7:
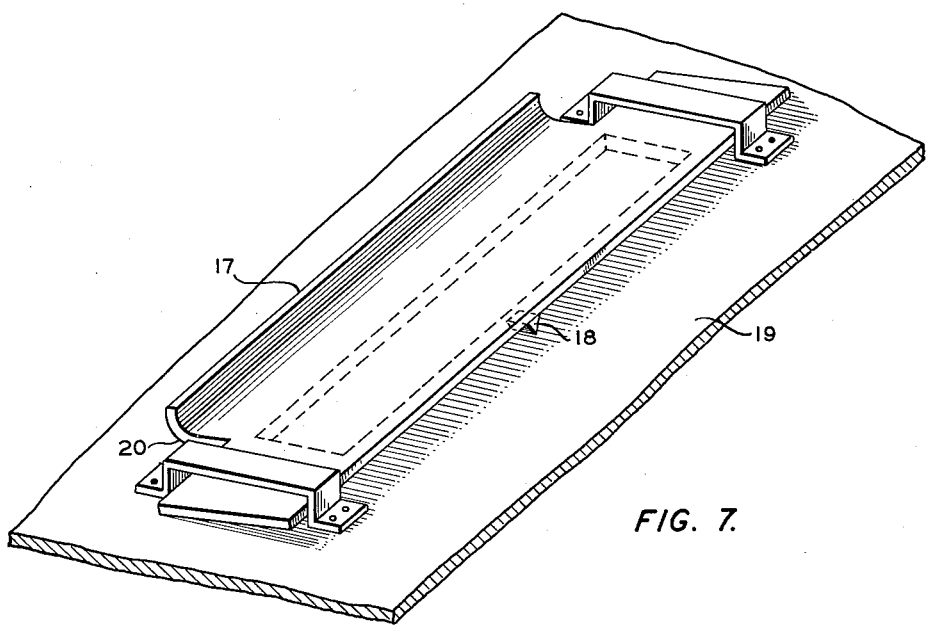
Figure 8:
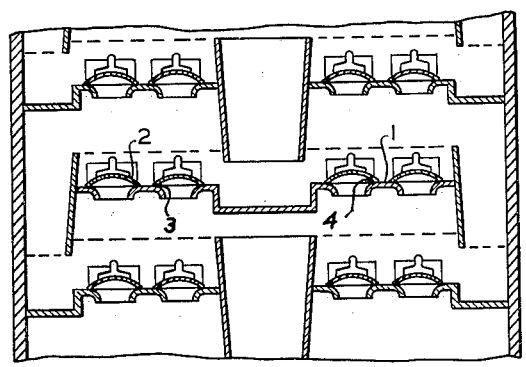

Figure 7 shows plate cover 17 having sharp protruding element 18 resting upon the flat surface of plate 19. This J-shaped plate cover contacts plate 19 at 20.

It will be understood by one skilled in the art in possession of this disclosure that other modifications are possible within the scope of the invention. Further, it will be understood that when vapors pass upwardly through the openings in the tray or plate the rush of the vapors will cause the plate covers or valves to vibrate due to the fact that there will be at all times somewhat more lift to one side of the valve or cover than there is to the other side thereof since the cover can never come to rest uniformly or sealingly upon the plate at the opening.

*Example*

Figure 1:
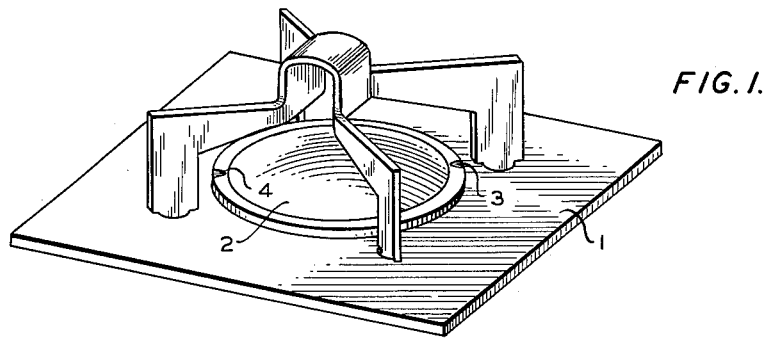
Figure 2:
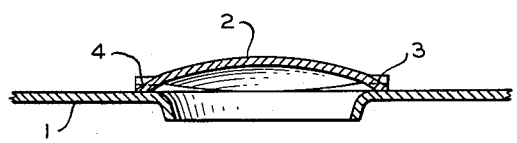
Figure 3:
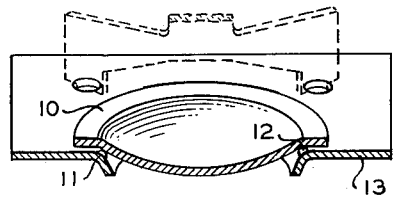
Figure 5:
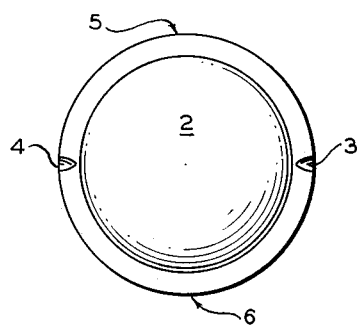
Figure 4:
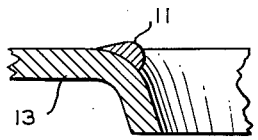
Figure 4 shows an enlarged view of protrusion such as 11 or 12 in plate surface 13.
Figure 6:
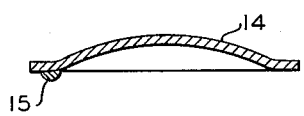
Figure 6 shows valve cover 14 having bead 15 attached to its under surface.

There were installed in a defluorinator tower in an alkylation plant, wherein an isoparaffin i.e., isobutane is alkylated with an olefin i.e., butylene, in the presence of hydrofluoric acid, 26 trays having valves substantially circular and being convex as shown in Figure 1. The edges of the circular valves were crimped downward 1/32 of an inch at two points substantially 180° apart. Upon extended use of the tower for defluorination of the alkylation effluent the tower was found to operate satisfactorily and no sticking of the valves occurred. Also, satisfactory fractionation was obtained.

In another operation only one crimp or bead is provided in a situation similar to the foregoing example and again, no sticking is encountered and operation is satisfactory.

Reasonable variation and modification are possible within the scope of the foregoing disclosure, the drawings, and the appended claims to the invention, the essence of which is that there has been provided a valve for a fractionating tray having one, two, or more protrusions thereon, or correspondingly the periphery of the opening in the tray under the valve has a protrusion, two, or more protrusions on its periphery, or there is one or more protrusions on the under side of the valve and one or more on the tray surface surrounding the opening so that the valve or opening cover at rest, when no vapor is flowing upwardly through the opening, cannot be in a position parallel to the plate, as set forth and described herein.

I claim:

1. A vapor liquid contacting apparatus adapted for use in a fractionation column comprising a tray having at least one planar opening, a cover placed loosely upon said opening detached from said tray, said cover comprising a peripheral rim, at least two and not more than three supports for said cover, said supports being so positioned and dimensioned that the plane of said rim of said cover, in tray engaging position, forms an acute angle with said tray, travel limiting and retaining means for said cover, said means permitting said cover to move away from said tray but retaining said cover in position to contact said tray to cover said opening when in tray engaging position.

2. A vapor liquid contacting apparatus adapted for use in a fractionation column comprising a tray having at least one planar opening, a cover placed loosely upon said opening detached from said tray, said cover comprising a peripheral rim, a pair of protrusions on said rim substantially on a diameter thereof, said protrusions and one additional part of said rim forming three supports for said cover, said supports being so positioned and dimensioned that the plane of said rim of said cover, in tray engaging position, forms an acute angle with said tray, travel limiting and retaining means for said cover, said means permitting said cover to move away from said tray but retaining said cover in position to contact said tray to cover said opening when in tray engaging position.

3. A vapor liquid contacting apparatus adapted for use in a fractionation column comprising a tray having at least one planar opening, a cover placed loosely upon said opening detached from said tray, said cover comprising a peripheral rim, a protrusion on said rim, said protrusion and one additional part of said rim forming two supports for said cover, said supports being so positioned and dimensioned that the plane of said rim of said cover, in tray engaging position, forms an acute angle with said tray, travel limiting and retaining means for said cover, said means permitting said cover to move away from said tray but retaining said cover in position to contact said tray to cover said opening when in tray engaging position.

References Cited in the file of this patent

UNITED STATES PATENTS

| | | |
|---|---|---|
| 1,151,329 | Audett et al. | Aug. 24, 1915 |
| 2,061,830 | Campbell | Nov. 24, 1936 |
| 2,718,900 | Nutter | Sept. 27, 1955 |
| 2,718,901 | Nutter | Sept. 27, 1955 |
| 2,772,080 | Huggins et al. | Nov. 27, 1956 |
| 2,809,821 | Constantikes | Oct. 15, 1957 |

OTHER REFERENCES

"Chemical Engineering," pp. 176, 177, May 1954.